Feb. 16, 1954
J. W. EDGEMOND, JR
2,669,265
JOINTER-PLANER
Filed June 1, 1951
5 Sheets-Sheet 2
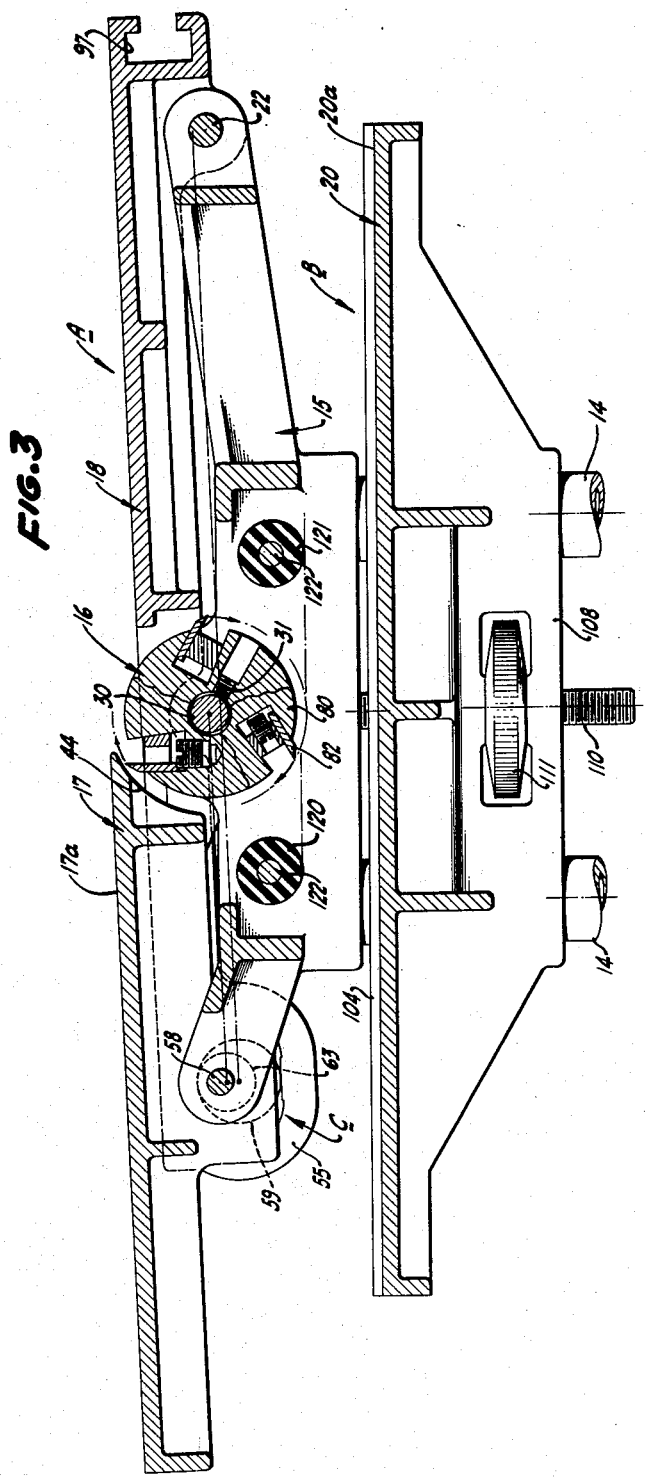
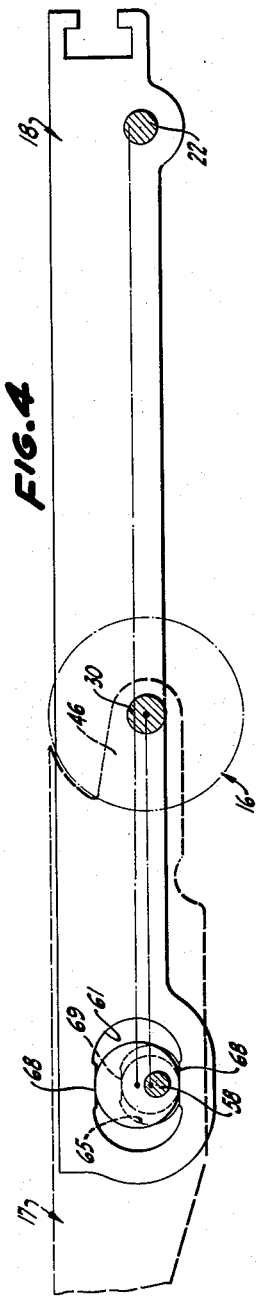
INVENTOR.
JOHN W. EDGEMOND, JR
BY
*Mellin and Hanson*
ATTORNEYS Feb. 16, 1954   J. W. EDGEMOND, JR   2,669,265
JOINTER-PLANER
Filed June 1, 1951   5 Sheets-Sheet 3
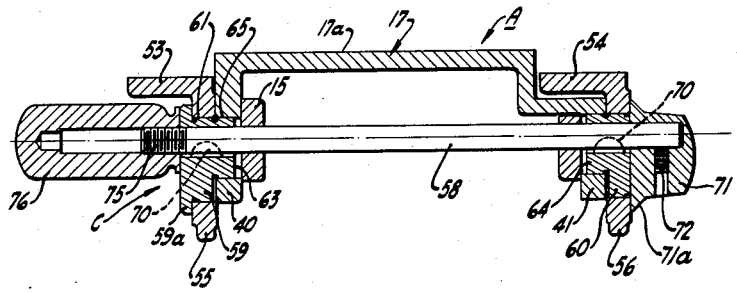
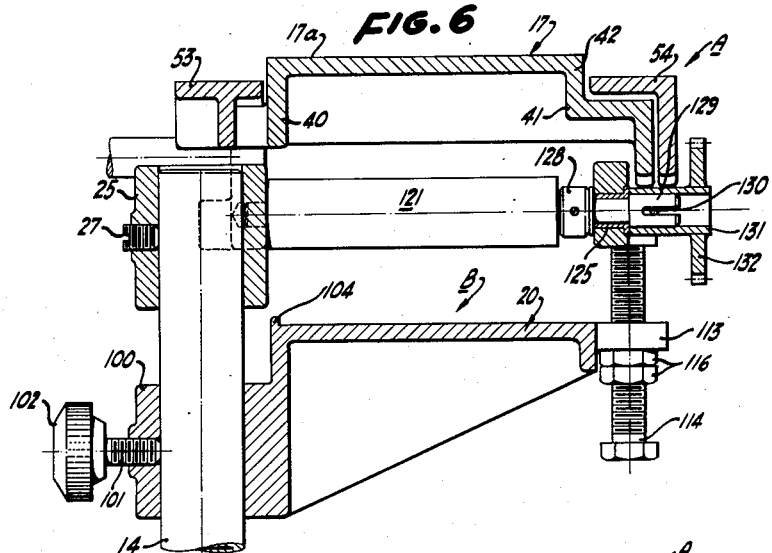
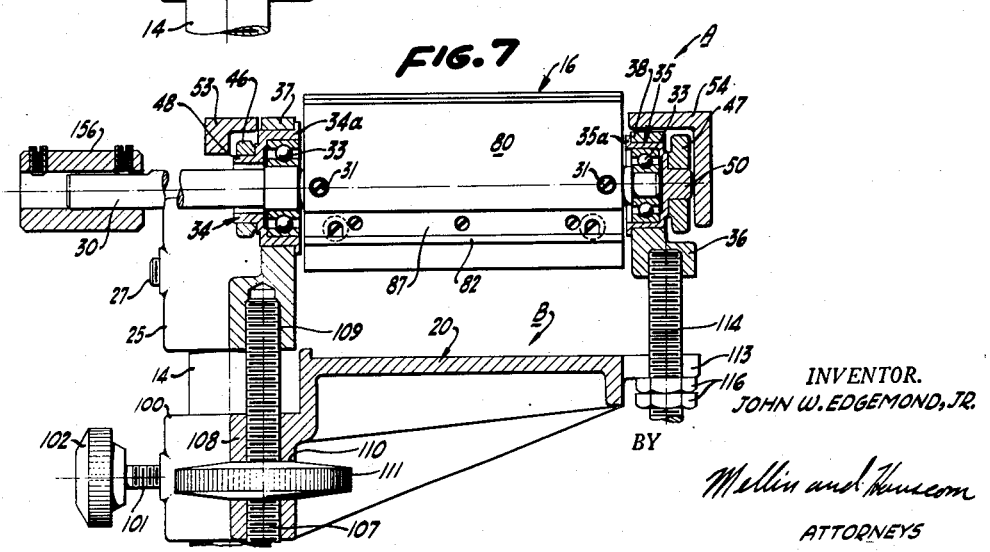
INVENTOR.
JOHN W. EDGEMOND, JR.
BY
ATTORNEYS

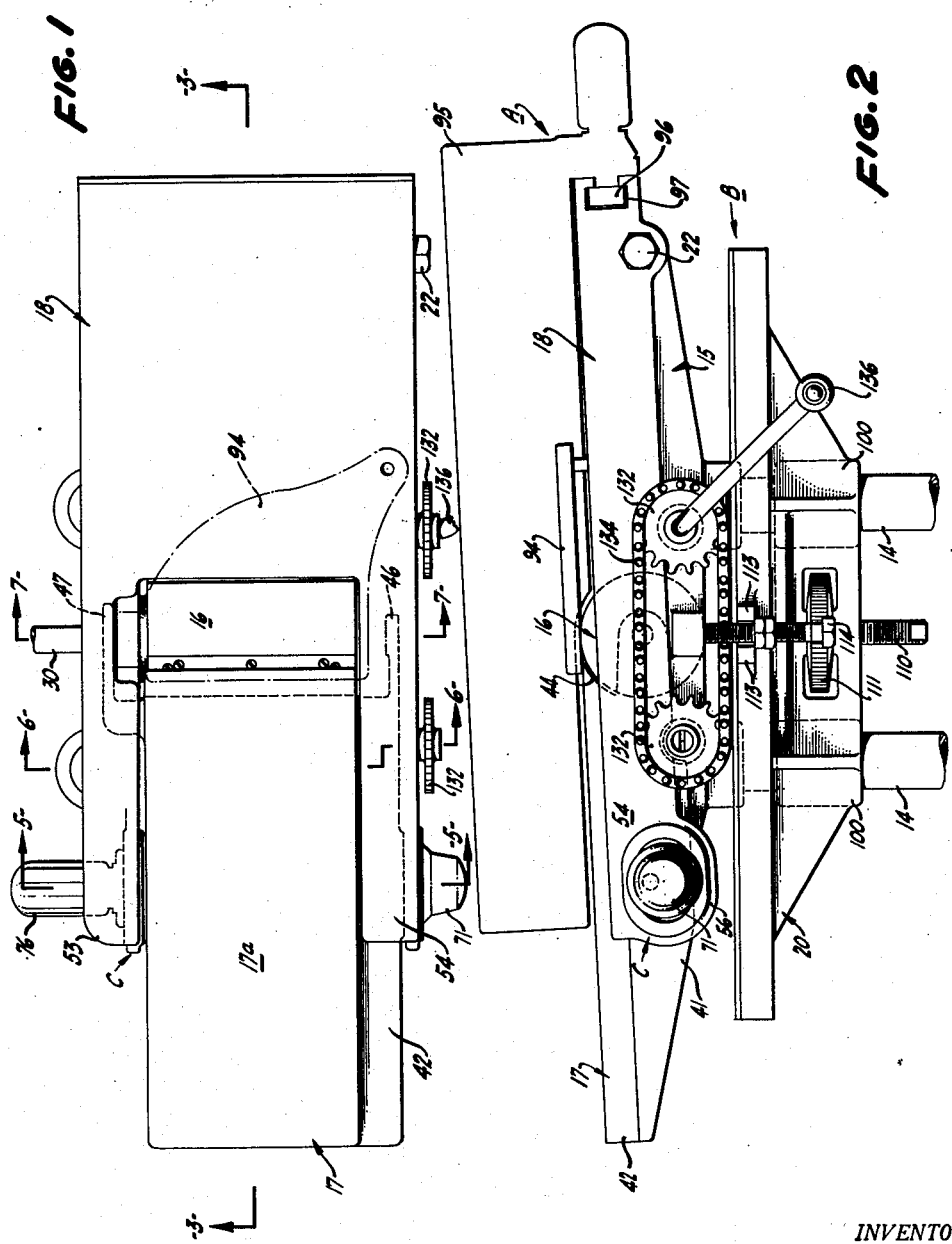

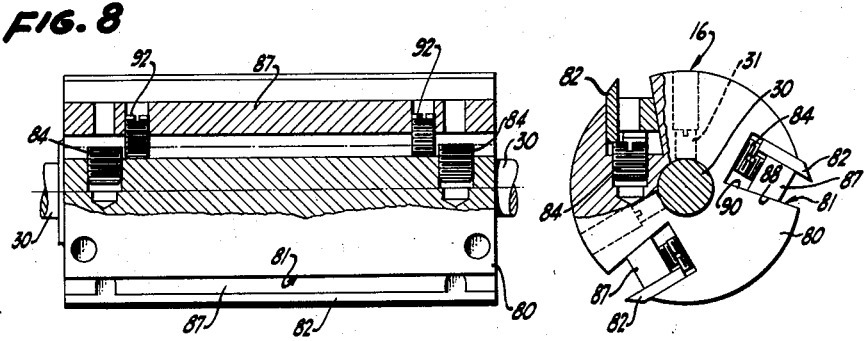

Patented Feb. 16, 1954

2,669,265

UNITED STATES PATENT OFFICE 2,669,265

JOINTER-PLANER

John W. Edgemond, Jr., Los Altos, Calif., assignor to Magna Engineering Corporation, San Francisco, Calif., a corporation of California Application June 1, 1951, Serial No. 229,377

2 Claims. (Cl. 144—129).

This invention relates to a jointer-planer.

The main object of the present invention is to provide an improved jointer-planer wherein there is a single rotary cutter adapted to cut work fed to the top of the cutter from a jointer assembly, and adapted to cut work fed to the bottom of the cutter from a planer assembly disposed below the jointer assembly.

Another object of the present invention is to provide a jointer-planer as above described in which the depth of cut of the jointer assembly can be adjusted, without interfering with the operation of the planer assembly and in which construction the planer assembly is adjustable relative to the bottom of the cutter to produce work of different thicknesses.

A principal object of the present invention is to provide an improved jointer apparatus having a take-off table arranged with the plane of its work-receiving surface tangent to the periphery of the cutter, which table is mounted for pivotal movement about the axis of rotation of the cutter to maintain the tangential relationship, said jointer apparatus including a feed table pivoted about an axis spaced from the cutter, and a mechanism for simultaneously adjusting the tables to vary the depth of cut by virtue of the adjustment of the feed table while maintaining a parallel relationship between the top surfaces of the tables so that work fed from the feed table will be supported by the take-off table as the work leaves the cutter.

Various other objects of the present invention will be apparent from the following description taken in connection with the accompanying drawings, wherein:

Fig. 1 is a plan view of a jointer-planer embodying the concepts of the present invention.

Fig. 2 is a side view in elevation of the apparatus disclosed in Fig. 1 and showing the tables of the jointer assembly adjusted to provide a maximum cut by the cutter.

Fig. 3 is a longitudinal sectional view of the apparatus taken along line 3—3 of Fig. 1.

Fig. 4 is a diagrammatic view in side elevation and showing the tables of the jointer assembly adjusted to a position where a minimum cut by the cutter is obtained, and showing the take-off table in dot-dash lines.

Fig. 5 is a vertical cross-sectional view taken along line 5—5 of Fig. 1 through the jointer assembly only, and showing particularly the mechanism for adjusting the feed table and the take-off table.

Fig. 6 is a vertical cross-section taken along line 6—6 of Fig. 1 showing a feed roller of the planer assembly.

Fig. 7 is a vertical cross-sectional view taken along line 7—7 of Fig. 1 showing the cutter and the mechanism for adjusting the height of the planer table.

Fig. 8 is a side view, partly in section, of the cutter of the jointer-planer.

Fig. 9 is an end view, partly in section, of the cutter.

Fig. 10 is a fragmentary view in side elevation of a jointer-planer embodying the concepts of the present invention and mounted on and driven by a convertible material-working machine.

Figure 11:
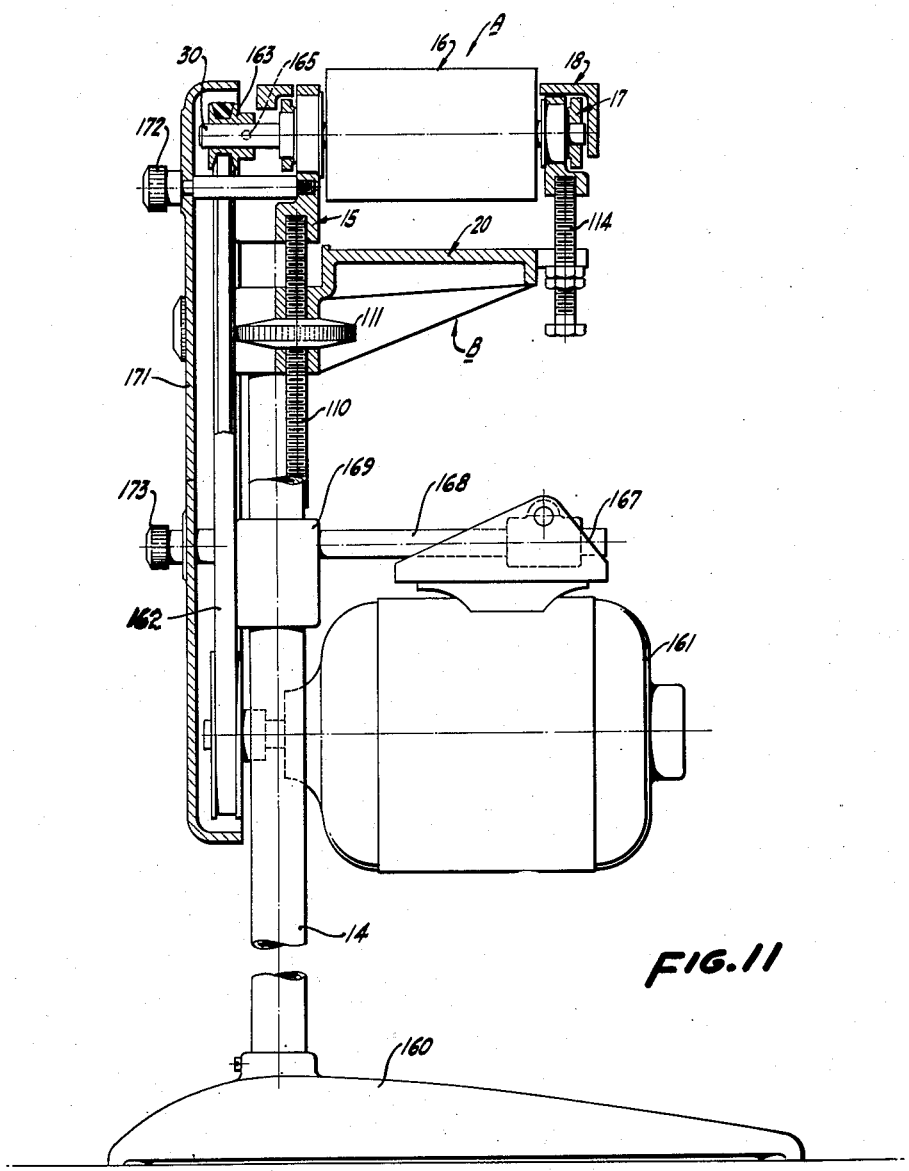
Fig. 11 is a vertical section through a jointer-planer embodying the concepts of the present invention and showing the jointer-planer as having a separate stand and drive of its own.

In general terms, the jointer-planer comprises a jointer assembly A secured to the upper ends of tubular posts 14, and a planer assembly B adjustably mounted on posts 14 below the jointer assembly A (see particularly Figs. 6 and 7). The posts 14 may be formed as part of a stand as shown in Fig. 11, or be supported from a convertible apparatus of the type shown in Fig. 10. The jointer assembly A includes a bed casting 15 on which is mounted a rotary cutter generally entitled 16, a take-off table 17, and a feed table 18, said cutter being adapted to cut at its top on work fed across the jointer assembly tables and at its bottom on work fed across the planer assembly table generally entitled 20. The take-off table 17 is supported with the plane of its top work-receiving surface tangent to the periphery of the cutter 16 and is pivotally mounted for adjustment about the axis of rotation of the cutter whereby at any position of adjustment the tangential relationship will be maintained. Feed table 18 is pivotally mounted on the forward end of bed casting 15 by a pivot bolt 22. An adjusting mechanism generally entitled C is disposed at the other end of the bed casting 15 and is operatively connected to both tables 17 and 18 of the jointer assembly for adjusting the tables to vary the depth of the cut by virtue of the adjustment of the feed table while maintaining a parallel relationship between the tops of the feed table and the take-off table. Therefore, work fed onto the cutter from the feed table will always be supported on the opposite side of the cutter by the take-off table regardless of the depth of the cut.

More in detail, bed casting 15 takes the form of an open framework casting (see Fig. 3) provided with bosses 25 (see Fig. 6) into which the upper ends of posts 14 extend. Set screws 27 are provided in bosses 25 for securing bed casting 15 to the posts 14.

Cutter 16 is mounted on an arbor 30 and secured thereto by means of set screws 31. Arbor 30 is supported adjacent at its ends by spaced bearings 33 housed within bearing housings 34 and 35 which are received within aligned apertures provided in spaced sides 36 and 37 of bed casting 15. The bearing housings have stop flanges 34a and 35a abutting against sides 36 and 37 respectively of bed casting 15, as shown in Fig. 7.

Take-off table 17 takes the form of an inverted box casting having a plane top work-receiving surface 17a and depending side flanges 40 and 41, flange 41 being formed with a rabbeted portion 42. At its forward end take-off table 17 is arcuately recessed at 44, as shown in Fig. 3, so as to partly overlie the cutter 16. Take-off table 17, at its forward end, is provided with and piovtally supported by a pair of forwardly protruding laterally spaced arms 46 and 47 formed at their forward end with aligned bores enabling arm 46 to fit on and be pivotally supported by a hub 48 formed on bearing housing 34 and arm 47 to fit on and be pivotally supported by a pin 50 formed on bearing housing 35. Arms 46 and 47 form extensions of side flanges 40 and 41 respectively of the take-off table 17.

As best appreciated from viewing Fig. 3, the plane containing the top surface 17a of the take-off table 17 is tangent to the periphery of cutter 16. Therefore, in every adjusted position, this tangential relationship would be maintained because the take-off table pivots about the axis of cutter 16. Therefore, as work is fed over the cutter, the cut face of the work slides onto the surface 17a of take-off table 17 in a face-to-face engagement therewith, whereby the work is fully supported during all stages of a cutting operation, first on the feed table alone, then partly on both tables, and then on the take-off table alone.

Intermediate the ends thereof, take-off table 17 is connected to and adapted to be adjusted by adjusting mechanism C, to be described more in detail hereinafter.

Feed table 18 takes the form of an inverted box casting pivotally mounted at its forward end on pivot bolt 22, as shown in Fig. 3, said pivot bolt extending through the righthand end of bed casting 15 and being retained in place by a nut (not shown). Feed table 18 has rearwardly extending laterally spaced arms 53 and 54 disposed on either side of take-off table 17 and provided with depending flanges 55 and 56 respectively (compare Figs. 1 and 5), by which the feed table is connected to the adjusting mechanism C.

Adjusting mechanism C includes an adjusting shaft 58 (see Fig. 5) rotatably extending through bed casting 15 and having eccentrically mounted thereon a pair of identical laterally spaced circular feed table adjusting cams 59 and 60 received within oblong openings 61 formed in depending flanges 55 and 56 of feed table 18, and a pair of identical laterally spaced circular take-off table adjusting cams 63 and 64 receivable within oblong openings 65 formed in depending flanges 40 and 41 of the take-off table 17. By virtue of their elongation, openings 61 and 65, as shown in Figs. 3 and 4, accommodate sidewise movement of the cams relative to tables 17 and 18. Openings 61 for feed table 18 are defined in part by horizontally disposed vertically spaced cam-engaging follower surfaces 68 with which the feed table cams 59 and 60 are in constant engagement. Openings 65 for cams 63 and 64 are partly defined by similar cam-engaging follower surfaces 69 with which take-off table cams 63 and 64 are in constant engagement, said cam-engaging follower surfaces thereby enabling adjustment of the feed table and take-off table upon rotation of adjusting shaft 58.

In the particular construction shown, cams 59 and 63 are formed as a single integral unit and likewise cams 60 and 64 are formed as a single integral unit. These units are keyed to adjusting shaft 58 by keys 70 which permit limited axial sliding movement of shaft 58 relative to the cam units for reasons to be explained.

Because the distance from the axis of adjusting shaft 58 to the pivotal axis of table 18 is greater than the distance from said shaft to the pivotal axis of table 17, cams 59 and 60 are formed larger than cams 63 and 64 in order that a parallel relationship between the tops of the tables will be maintained upon adjustment of the tables.

On the righthand end of adjusting shaft 58 there is a manual adjusting knob 71 secured to the shaft by a set screw 72. The periphery 71a of knob 71 is preferably graduated in terms of depth of cut, and the feed table on the portion of its depending flange 56 adjacent the periphery of knob 71 is provided with a reference mark to permit setting of the knob for a particular depth of cut. Knob 71 is mounted eccentrically on shaft 58 but concentrically with respect to large cams 59 and 60 and, therefore, the periphery 71a of knob 71 and the reference mark on flange 56 of the feed table will always be in correct association.

On its opposite end, adjusting shaft 58 threadedly receives a handle 76 which engages a flange 59a formed on cam 59. The tables are locked in an adjusted position by turning handle 76 so as to draw adjusting shaft 58 slightly to the left as the parts are depicted in Fig. 5, to clamp flanges 55 and 56 of feed table 18 between flange 59a of cam 59 and knob 71 to create a frictional force between these parts sufficient to prevent relative rotation between adjusting shaft 58 and said tables. Obviously, when the handle is turned to relieve the clamping effect, adjustment of the feed table and the take-off table by manual rotation of knob 71 is permitted.

Cutter 16, which is best shown in Figs. 3, 8 and 9, includes a cutter body or head 80 having three longitudinally outwardly tapering non-radial grooves 81, each groove receiving a cutting blade 82. Each blade is adapted to be adjusted inwardly or outwardly by a pair of adjusting screws 84 threadedly received by the head 80, said cutting blades being supported by the heads of screws 84, as is clearly shown in Fig. 9. The adjusting screws 84 are provided with screwdriver slots or equivalent formations to permit adjustment thereof.

Locking bars 87 are provided for locking the blades 82 in adjusted positions, and are disposed within grooves 81 and have tapered faces 88 tapered complementary to opposed tapered faces 90 of grooves 81. Locking bars 87 threadedly receive therethrough adjusting screws 92 which engage the bottom of groove 81, as shown in Fig. 8, these screws upon adjustment are adapted to jam the locking bars between surfaces 90 of groove 81 and blades 82, therefore locking the blades in place in their adjusted position.

A suitable spring guard 94, shown in dot-dash lines in Fig. 1, is provided on the feed table 18 and its construction is known and, therefore, need not be described in detail. Also, a suitable fence 95 having a block 96 receivable within a groove 97 at the end of feed table 18 is provided and is of known construction and, therefore, also need not be described in detail.

The operation of the jointer assembly has been explained during the description and need not be repeated.

The planer assembly B includes planer table 20 which takes the form of an inverted box casting having a plane work receiving surface 20a, and bosses 100 through which posts 14 extend, said bosses being secured to the posts by set screws 101 provided with knurled knobs 102. The planer table 20 may conveniently be provided with a raised rib 104 (see Fig. 6) to serve as a guide for the work moved across table 20.

Planer table 20 is supported for adjustment with respect to cutter 16 in the following manner. There is an adjusting screw 107 slidably received through a web 108 joining bosses 100 (see Fig. 7), the upper end of the screw being threadedly received in bed casting 15 and jammed into place so as to be effectively fixed to bed casting 15. An opening 110 is provided in web 108 of planer table 20 to accommodate an adjusting nut 111 threadedly received on adjusting screw 107. By loosening set screws 101 on bosses 100 and rotating adjusting nut 111, the distance between the work receiving surface 20a of planer table 20 and the bottom of cutter 16 may be varied to produce different thicknesses of work.

The righthand side of planer table 20 (as the parts are depicted in Fig. 7) is provided with fingers 113 which embrace a hanger bolt 114 threadedly received within the side 36 of bed casting 15 and jammed into place. There are lock nuts 116 on hanger bolt 114 for abutting against the under sides of fingers 113 and, therefore, supporting the righthand side of planer table 20. For downward adjustment of table 20, obviously lock nuts 116 will have to be threaded downwardly before adjusting nut 111 is rotated.

Mechanism for feeding work across planer table 20 is provided and comprises a pair of rubber feed rollers 120 and 121 mounted on shafts 122, the ends of the shafts being rotatably supported in bed casting 15, the righthand ends of shafts 122 being supported by bushings 125 receivable within casting 15. There are suitable lock collars 128 on shafts 122, as shown in Fig. 6.

Feed roller 120 is disposed to resiliently engage the work before passing under cutter 16 and feed roller 121 is disposed to resiliently engage the planed face of the work leaving the cutter, the latter feed roller having its axis of rotation closer to planer table 20 than feed roller 120 to compensate for the difference in thickness of the work on the opposite side of the cutter.

The outer or righthand ends of shafts 122 have fixed thereto couplings 129 suitably slotted to receive coupling pins 130 fixed to hubs 131 of sprockets 132. Sprockets 132 are drivingly connected by a chain 134 (see Fig. 2) and are adapted to be driven by a crank 136 fixed to the hub of the sprocket for feed roller 121. By means of coupling members 129 and 130, a detachable drive to the feed rollers is provided permitting the sprockets 132, chain 134 and crank 136 to be removed whenever desired.

The operation of the planer assembly is as follows: The work, which is of approximate size to be planed to its finished dimension, is placed on planer table 20 against rib 104 and moved into engagement with rubber feed roller 120. Crank 136 is then rotated to cause rotation of roller 120 which operates to advance the work into engagement with the cutter 16, the work being cut and then engaging rubber feed roller 121 when leaving cutter 16, which latter roller operates to fully advance the rear end of the work past cutter 16 and across planer table 20 where the outer finished end thereof can be grasped and the work removed. If the work to be planed is originally too thick it can be cut down on the jointer assembly to a thickness slightly greater than its finished thickness and then be run through the planer.

As best appreciated from a consideration of Fig. 3, adjustment of the jointer assembly does not interfere with the operation of the planer assembly due to the novel manner of supporting and adjusting the jointer tables.

The jointer-planer of the present invention can be provided with its own stand, as shown in Fig. 11, or supported and driven by a convertible apparatus, such as disclosed in Fig. 10 and described in the copending application of Hans Goldschmidt for Convertible Material Working Machine, Serial 769,148, filed August 18, 1947.

Fig. 10 shows the latter arrangement wherein the jointer-planer is provided with a bracket 141 having bosses 142 for receiving the lower ends of posts 14, said bracket also having other bosses 144 for receiving the outer protruding ends of tubular ways 147 of the convertible apparatus described in the identified copending application. The ways are supported at their righthand ends as the parts are depicted in Fig. 10 by a standard 150.

Cutter 16 of the jointer-planer is driven by means of a motor 151 through a driving stepped pulley 152, a belt 153, a driven stepped pulley 154, a driven shaft 155 and a coupling 156 which is secured to the lefthand end of the cutter arbor 30, as the parts are depicted in Fig. 10.

The jointer-planer may also be mounted on its own stand by having elongated posts 14 fixed at their lower ends in a base 160. The cutter 16 under these circumstances is driven by a motor 161 through a belt 162, a driven pulley 163 which is mounted on the lefthand end of cutter arbor 30, as the parts are depicted in Fig. 11, by set screw 165. Motor 61 is supported from a hanger bracket 167 which in turn is supported on arms 168 fixed to a bracket 169 which has bosses to receive the posts 14 and which bosses are provided with set screws, not shown, for securing the bracket to the posts. There is a belt guard 171 secured by means of screws 172 and 173 to bed casting 15 and the bracket 169.

By the present invention, a jointer-planer has been provided in which there is a single rotary cutter adapted to cut at its top on work fed thereto by a jointer assembly and adapted to cut at its bottom on work fed thereto over a planer table. The jointer assembly is constructed so that the depth of cut of the work fed thereacross can be varied in a manner such as not to interfere with the operation of the planer table therebeneath. The present invention also provides a novel jointer assembly in which the take-off table has the plane of its top surface tangent to the periphery of the cutter and which take-off table is pivoted about the axis of rotation of the cutter so that work leaving the cutter will be supported by the top surface of the take-off table. Both the take-off table and feed table are mounted for adjusting movement by a single adjustment means whereby simultaneous adjustment of the tables is effected in a manner to maintain a parallel relationship between the top working surfaces of the tables so that a piece of work will be supported by a face-to-face engagement of its bottom stepped surface with said table during a cutting operation.

Although the cam-type adjusting mechanism shown is preferred, the invention is not intended to be limited to such a specific construction, since other types of adjusting mechanisms such as link, wedge, etc., can be substituted therefor.

Having thus described my invention, what I claim and desire to obtain by Letters Patent is:

1. A jointer comprising: an open, generally rectangular frame; a rotary cutter mounted to and within said frame intermediate the ends thereof; a take-off table pivoted at its forward end to said frame on an axis concentric with the axis of said rotary cutter; a feed table pivoted at its forward end to the forward end of said frame, said feed table being provided with forwardly extending arms arranged to straddle the sides of said take-off table; a cam shaft journalled in the rear end of said frame in parallelism with the axis of said cutter; opposed cams fixed to said cam shaft, each of said cams being arranged to rotate within cam openings formed in the overlapping portions of said arms and take-off table and the cam surfaces on said cams being so arranged that upon rotation of said cam shaft each of said tables will rotate about its axis in the same angular direction in parallelism with each other; means fixed to said cam shaft for adjusting its angular position; and means for locking said cam shaft to said frame in any desired angular position.

2. A jointer comprising: an open, generally rectangular frame; a rotary cutter mounted to and within said frame intermediate the ends thereof; a take-off table pivoted at its forward end to said frame on an axis concentric with the axis of said rotary cutter; a feed table pivoted at its forward end to the forward end of said frame, said feed table being provided with forwardly extending arms arranged to straddle the sides of said take-off table; a cam shaft journalled in the rear end of said frame in parallelism with the axis of said cutter; opposed cams fixed to said cam shaft, each of said cams being arranged to rotate within cam openings formed in the overlapping portions of said arms and take-off table and the cam surfaces on said cams being so arranged that upon rotation of said cam shaft each of said tables will rotate about its axis in the same angular direction in parallelism with each other; an operating handle fixed to one end of said cam shaft for rotating it to any predetermined angular position; and lock nut threaded on the other end of said cam shaft and by means of which the overlapping portions of said tables can be maintained in frictional locking engagement with each other in any predetermined set position.

JOHN W. EDGEMOND, Jr.

References Cited in the file of this patent

UNITED STATES PATENTS

| Number | Name | Date |
|---|---|---|
| 857,757 | Reid | June 25, 1907 |
| 878,911 | Thomas | Feb. 11, 1908 |
| 1,203,226 | Matthew | Oct. 31, 1916 |
| 1,593,316 | Tetard | July 20, 1926 |

FOREIGN PATENTS

| Number | Country | Date |
|---|---|---|
| 3,136 | Great Britain | 1880 |
| 58,035 | Switzerland | Mar. 2, 1911 |
| 233,906 | Germany | Apr. 26, 1911 |
| 292,436 | Germany | June 10, 1916 |
| 453,481 | France | June 9, 1913 |